US008300085B2

(12) United States Patent
Yang et al.

(10) Patent No.: US 8,300,085 B2
(45) Date of Patent: Oct. 30, 2012

(54) OCCLUSION HANDLING IN STEREO IMAGING

(75) Inventors: Qiong Yang, Beijing (CN); Yi Deng, Beijing (CN); Xiaoou Tang, Beijing (CN); Xueyin Lin, Beijing (CN)

(73) Assignee: Microsoft Corporation, Redmond, WA (US)

(*) Notice: Subject to any disclaimer, the term of this patent is extended or adjusted under 35 U.S.C. 154(b) by 1556 days.

(21) Appl. No.: 11/462,342

(22) Filed: Aug. 3, 2006

(65) Prior Publication Data

US 2007/0086646 A1    Apr. 19, 2007

Related U.S. Application Data

(60) Provisional application No. 60/726,710, filed on Oct. 14, 2005.

(51) Int. Cl.
*H04N 15/00* (2006.01)
*H04N 13/00* (2006.01)
*G06K 9/00* (2006.01)

(52) U.S. Cl. .......................... 348/42; 382/154
(58) Field of Classification Search ............... 348/42
See application file for complete search history.

(56) References Cited

U.S. PATENT DOCUMENTS

| 5,202,928 | A  | * | 4/1993  | Tomita et al. | 382/154 |
| 2005/0078866 | A1 |  | 4/2005  | Criminisi et al. | |
| 2005/0286756 | A1 | * | 12/2005 | Hong et al. | 382/154 |

FOREIGN PATENT DOCUMENTS

| JP | 2003150940 | 5/2003 |
| JP | 2004102323 | 4/2004 |
| JP | 2004220292 | 8/2004 |

OTHER PUBLICATIONS

International Search Report and The Written Opinion of the International Searching Authority.
Birchfield et al.; "A Pixel Dissimilarity Measure That Is Insensitive to Image Sampling"; IEEE Transactions on Pattern Analysis and Machine Intelligence, vol. 20, No. 4, Apr. 1998. pp. 401-406.
Bleyer et al; "Graph-based surface reconstruction from stereo pairs using image segmentation"; 12 pages.
Boykov et al.; "Fast Approximate Energy Minimization via Graph Cuts"; 1999 IEEE; 8 pages.
Brown et al.; "Advances in Computational Stero"; 2003 IEEE Computer Society; pp. 993-1008.

(Continued)

*Primary Examiner* — Behrooz Senfi
*Assistant Examiner* — Hee-Yong Kim
(74) *Attorney, Agent, or Firm* — Lee & Hayes, PLLC

(57) ABSTRACT

The handling of occlusions in stereo imaging is disclosed. In one implementation, an association between a discontinuity in one stereo image and an occlusion in a second stereo image is utilized. In such an implementation, the first and second stereo images are segmented. A mapping of a discontinuity within the second stereo image is used to form at least part of a boundary of an occlusion in the first stereo image. The mapped discontinuity is found at a boundary between two segments in the second stereo image, and once mapped, divides a segment in the first stereo image into two patches. An energy calculation is made in an iterative manner, alternating with changes to a solution with the disparities and occlusions of the patches. Upon minimization, disparities and occlusions at the patch and pixel level are available.

20 Claims, 9 Drawing Sheets

OTHER PUBLICATIONS

Christoudias et al.; "Synergism in Low Level Vision"; 6 pates.
Egnal et al.; "Detecting Binocular Half-Occlusions; Empirical Comparisons of Five Approaches"; IEEE Transactions on Pattern Analysis and Machine Intelligence, vol. 24, No. 8, Aug. 2002; pp. 1127-1133.
Hong et al.; "Segment-based Stereo Matching Using Graph Cuts"; 8 pages.
Kolmogorov et al.; "Computing Visual Correspondence with Occlusions using Graph Cuts"; 8 pages.
Kolmogorov et al.; "What Energy Functions Can Be Minimized via Graph Cuts?"; 17 pages.
Lin et al.; "Surfaces with Occlusions from Layered Stereo"; IEEE Transactions on Pattern Analysis and Machine Intelligence, vol. 26, No. 8, Aug. 2004; pp. 1073-1078.
Ogale et al.; "Stero correspondence with slanted surface; critical implications of horizontal slant"; Proceedings of the 2004 IEEE Computer Society Conference on Computer Vision and Pattern Recognition (CVPR'04); 6 pages.
Scharstein et al.; "A Taxonomy and Evaluation of Dense Two-Frame Stereo Correspondence Algorithms"; 61 pages.
Sun et al.; "Symmetric Stereo Matching for Occlusion Handling"; 8 pages.
Tao et al.; "A Global Matching Framework for Stereo Computation"; 2001 IEEE; pp. 532-539.
Wei et al.; "Region-Based Progressive Stereo Matching"; Proceedings of the 2004 IEEE Computer Society Conference on Computer Vision and Pattern Recognition (CVPR'04); 8 pages.
Zhang et al.; "Stereo Matching with Segmentation-Based Cooperation"; 16 pages.
Zitnick et al.; "A Cooperative Algorithm for Stereo Matching and Occlusion Detection"; 2000 IEEE; pp. 675-684.

\* cited by examiner

OCCLUSION HANDLING IN STEREO IMAGING

RELATED APPLICATIONS

This patent application claims priority to related U.S. patent application Ser. No. 60/726,710, titled "A Symmetric Patch-Based Correspondence Model for Occlusion Handling", filed on Oct. 14, 2005, commonly assigned herewith, and hereby incorporated by reference.

BACKGROUND

Occlusion handling is one of the major challenges in stereo imaging. For a two-frame stereo system, a point in an image is occluded if its corresponding point is invisible in the other image. Occlusions must be computed to allow combination of left and right images. However, computation of occlusions in stereo images is ambiguous and can produce defective images.

SUMMARY

The handling of occlusions in stereo imaging is described. In one implementation, an initial estimate of a disparity and occlusions between first and second stereo images is made. Patches are formed in the stereo images, wherein the patches are formed using a relationship between an occlusion in the first stereo image and a discontinuity in the second stereo image. An energy value is computed in an iterative manner, wherein the energy computation is based on a current solution indicated by disparities and occlusions of the patches formed. Where the energy value has decreased from a previous iteration, a change is made to the current solution. In to the current solution. In one example implementation, the change includes an alpha-move, wherein disparities and occlusions in some patches are set to the alpha value, which is changed with each iteration. When the energy value fails to decrease, the disparities and occlusions of patches within the stereo image pair have been determined, and can be easily obtained at the pixel level.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Occlusion handling is one of the major challenges in stereo imaging. For a two-frame stereo system, a point in a first image is occluded if its corresponding point is invisible in a corresponding second image. Aspects of the disclosed system and method of handling occlusion are consistent with the observation that an occlusion border in one image corresponds to a discontinuity in the corresponding image, and that the discontinuity often results in strong texture on the other image that can be achieved by color segmentation. Therefore, the disclosed system and method introduces a framework that can use the segmentation of one image to help compute the occlusion in the other.

Some embodiments described herein use segmentation of both the left and right images, and they use a patch-based framework to handle occlusions explicitly. Accordingly, the concept of patch is introduced, which is based in part on the observation that the shared edge of a visible area and an occluded area corresponds to a discontinuity in the other image. Thus, both images may be segmented, and the segment of one image may be warped to the other image according to a disparity. The warped segment may then be divided into patches using the segment boundaries in the other image. In one implementation, the boundary of an occlusion is constrained to be the boundary of one or more patches, and a symmetric global framework utilizing graph cuts is constructed to find the disparity and occlusions simultaneously embodied by the patch.

Figure 1:
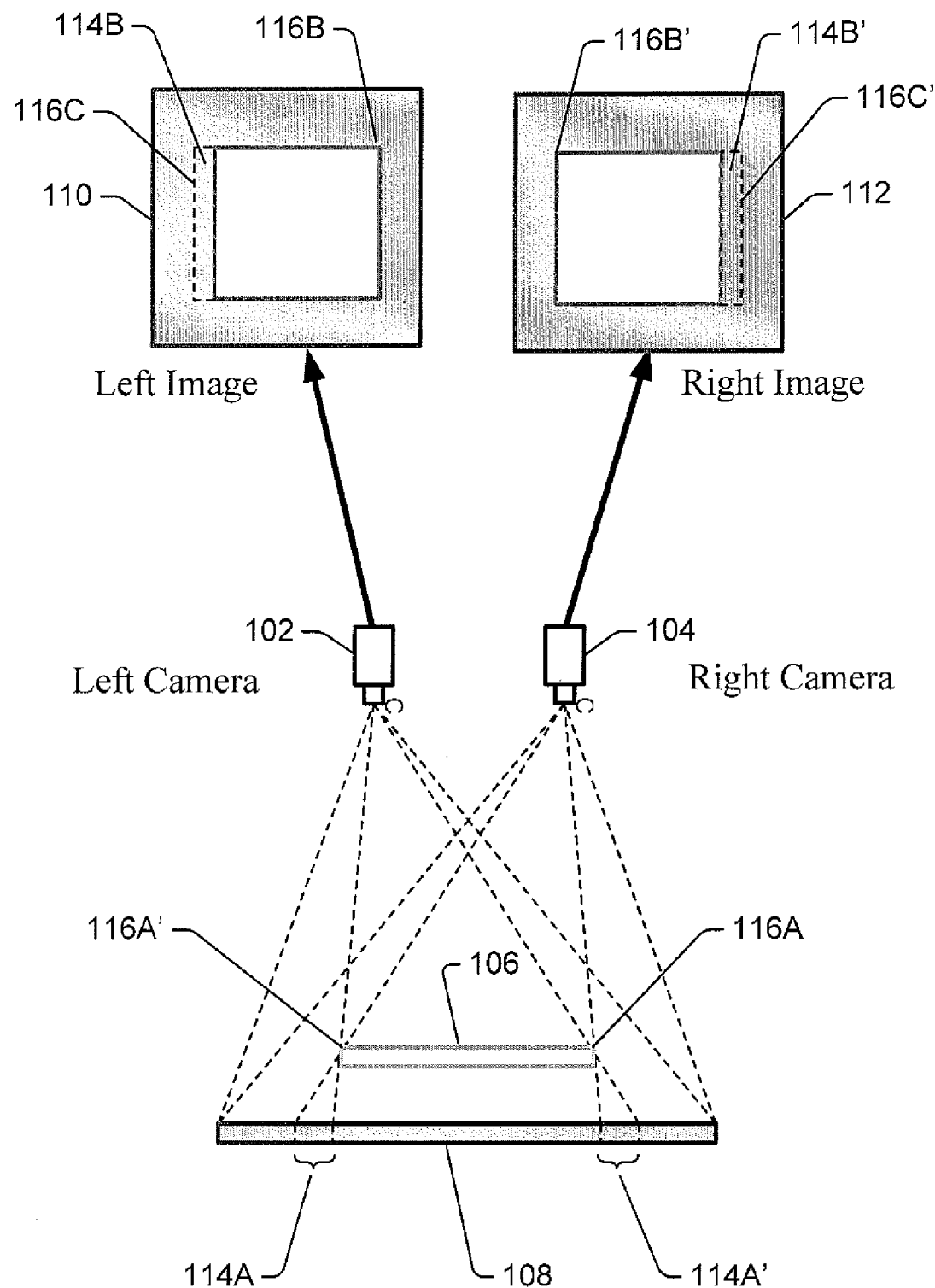
FIG. 1 illustrates exemplary aspects involved in the creation of a stereo image having occlusions, wherein both left and right images include foreground and background elements and discontinuous and/or occluded areas.

FIG. 1 shows an example of an environment wherein occlusion handling is employed. Left and right cameras 102, 104 are directed to a field of view including a foreground object 106 and a background object 108. The left and right cameras 102, right cameras 102, 104 produce left and right images 110, 112, which are displayed above each respective camera. The foreground object 106 obstructs the view of each camera 102, 104 differently; i.e. the foreground object 106 occupies a somewhat different location in each camera's field of view. Accordingly, each camera has a different occluded region. Thus, each camera 102, 104 has an occluded region 114A, 114A', respectively, that is within the field of view of that camera, but which not within the field of view of the other camera. In particular, the portion 114A of the field of view of the left camera 102 is not within the field of view of the right camera 104. Similarly, the portion 114A' of the field of view of the right camera 104 is not within the field of view of the left camera 102. Accordingly, the image 110, 112 associated with each camera includes an occluded region that visible in the view of that camera, but that is not visible from the other camera. In particular, the left image 110 includes a region 114B that is visible within the field of view of the left camera 102, but is not visible within the field of view of the right camera 104. Similarly, the right image 112 includes a region 114B' that is visible within the field of view of the right camera, but is not visible within the field of view of the left camera. Thus, FIG. 1 illustrates that a stereo image pair having both foreground and background objects can result in left and right images having different occluded regions.

FIG. 1 also illustrates that a point of discontinuity in a first image (e.g. the image 110 obtained by the left camera) corresponds to an edge of an occluded portion of the second image (e.g. the image 112 obtained by the right camera). For example, there is a discontinuity in the field of view of the left camera at 116A, which exists due to the "break" between the right edge of the foreground object 106 and the background object 108. The discontinuity 116A seen in the field of view of the left camera is seen in the left image 110 at 116B, which illustrates the "break" between the foreground object and the background object in the left image. Similarly, there is a discontinuity in the field of view of the right camera at 116A', which exists due to the "break" between the left edge of the foreground object 106 and the background object 108. The discontinuity 116A' seen in the field of view of the right camera is seen in the right image 112 at 116B', which illustrates the "break" between the foreground object and the background object in the right image. It is important to note that the discontinuity 116B in the left image corresponds to a portion of the boundary 116C' of the occluded area 114B' in the right image. Similarly, the discontinuity 116B' in the right image corresponds to a portion of the boundary 116C of the occluded area 114B in the left image. Thus, a discontinuity in one image can correspond to part of a border of an occlusion in a second image.

To summarize certain aspects of FIG. 1, a region 114A' is obscured from the field of view of the left camera, but is visible to the right camera. This results in an occluded region 114B' in the right image 112, i.e. a region within the right image that is not visible from the left camera. A "break" between foreground and background objects in the field of view of the left camera at 116A results in a discontinuity in the left image at 116B. This discontinuity at 116B in the left image 110 is associated with, and indicates, a portion of the boundary 116C' of the occluded region 114B' in the right image 112. Thus, a discontinuity in one image of a stereo image pair can be used to locate a portion of a boundary of an occlusion in a second image in the stereo image pair.

Figure 2:
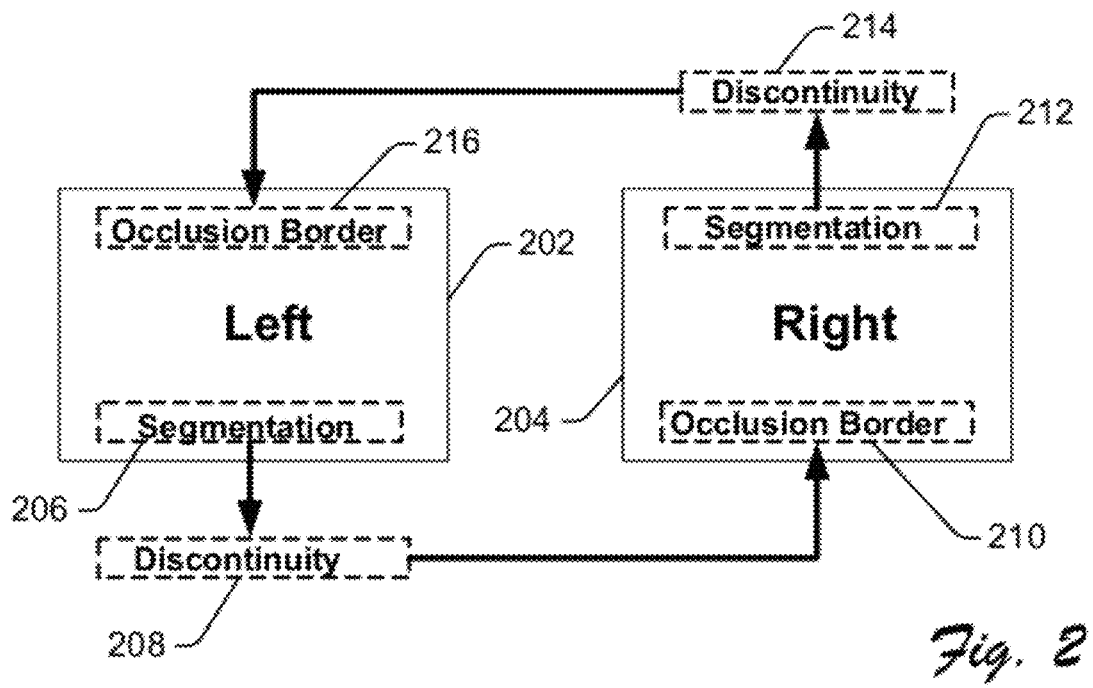
FIG. 2 is a block diagram showing an exemplary relationship between a discontinuity in a first stereo image and an occlusion in a second stereo image or vice versa.

FIG. 2 is a diagram illustrating an example of a relationship between left and right stereo images. In particular, the left and right images 202, 204 are segmented. Segmentation groups similarly colored pixels together, thereby revealing discontinuities 208, 214 in each image. As seen in the discussion of FIG. 1, a discontinuity 208 in the left image 202 may indicate a border of an occlusion in the right image 204, and visa versa. Accordingly, FIG. 2 illustrates a relationship between image segmentation 206, 212, the discovery of discontinuities 208, 214 based on the segmentation, and the discovery of occlusion borders 210, 216 in the other image, corresponding to the discontinuities. In particular, segmentation 206, 212 of an image reveals its discontinuities. Those discontinuities may be related to occlusions in corresponding areas of the other image.

Labeling System

In one implementation, an aspect of occlusion handling involves a formal formulation of a labeling system sufficient to address the stereo problem. In one example of this formulation, let L and R be the set of pixels in the left and right images respectively, and let $P = L \cup R$. A pixel in the left image will have coordinate $(p_x, p_y)$, and a corresponding pixel in the right image will have coordinate $(p_x', p_y')$. In this example, the stereo problem is formulated as a labeling problem, in which each pixel $p \in P$ must be assigned a label $f_p$ within some label set L. That is, in one implementation a goal is to find a labeling configuration f that assigns each pixel $p \in P$ a label $f_p \in L$. Accordingly, the labeling configuration f defines the disparity between the two stereo images.

To describe the generally slanted plane, a 3-parameter linear transform can be used, wherein parameters of the linear transform are used as the definition of labels, i.e.

$$f_p = f_{p'} = \langle c_1, c_2, c_3 \rangle \Leftrightarrow p \xleftrightarrow{\langle c_1, c_2, c_3 \rangle} p', \text{ where}$$
$$p_x' = c_1 p_x + c_2 p_y + c_3, \; p_y' = p_y$$

where $$p \xleftrightarrow{\langle c_1, c_2, c_3 \rangle} p'$$

means that p and p' are corresponding points if a label $<c_1, c_2, c_3>$ is assigned to both of them. Alternatively, if a point from a first image is occluded in the second image, the point's label is $\phi$.

A second aspect of occlusion handling involves the patch and visibility consistency. In order to find the labels for all the points that are mostly accordant to the input stereo image pair, prior assumptions may be employed, e.g. a smoothness assumption and uniqueness constraints. In implementations involving segment-based algorithms, a discontinuity assumption may be used. However, the border of segments in one image is not always the border of occlusion in the other image, and the shared edge of a visible area and an occluded area may not always correspond to a discontinuity of the other image. Therefore, in one implementation, the segments of one image may be separated into patches by mapping the discontinuity from the other image. Such an implementation may impose a new constraint to enforce the same visibility for all the pixels within each patch.

Figure 3:
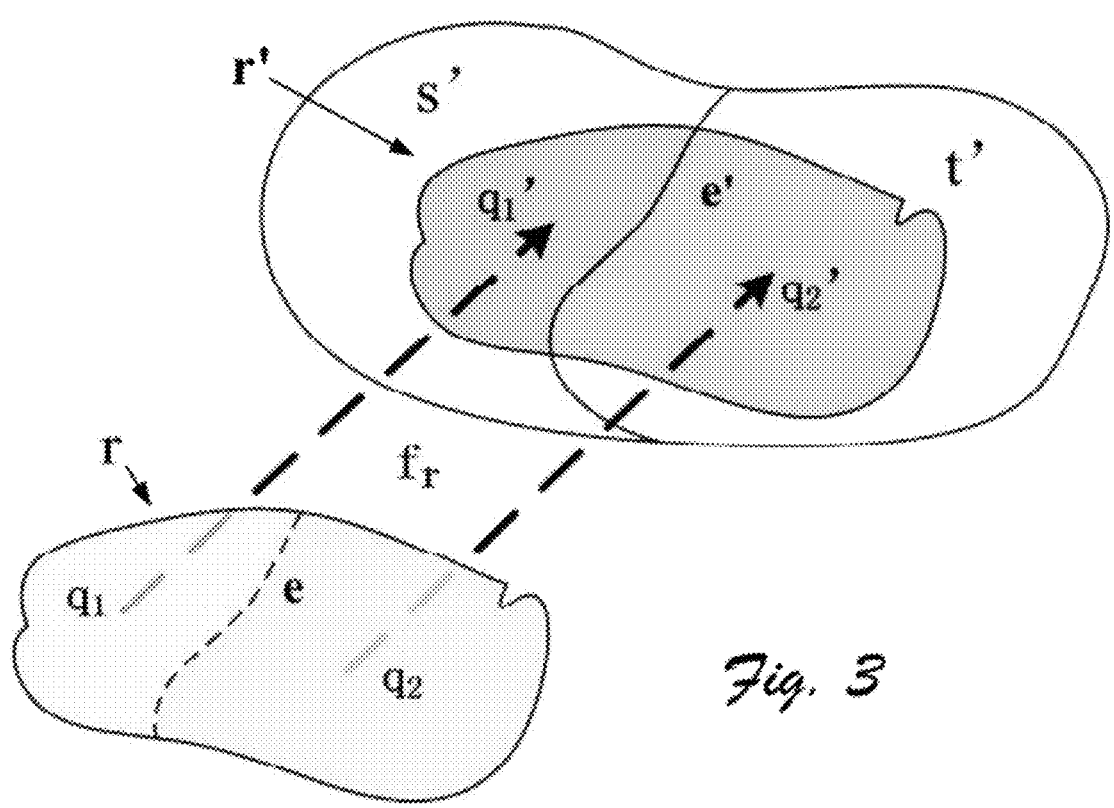
FIG. 3 illustrates exemplary aspects of patch creation, and particularly illustrates an implementation exploiting the relationship between discontinuities and occlusions in stereo image pairs.

FIG. 3 illustrates aspects related to the creation and definition of patches. As an overview, a segment r in the left image is warped (or mapped) to the right image. Having been so mapped, the warped image r' in the right image is divided into $q_1'$ and $q_2'$ by the edge e' between segments s' and t'. The edge e' in the right image corresponds to (i.e. can be mapped to) the edge e in the left image, which separates segment r into patches $q_1$ and $q_2$. Accordingly, the segment r is separated into two patches $q_1$ and $q_2$ in a first stereo image by using segmentation information from the second stereo image.

More particularly, suppose that a segment r is a region in the left image, image, and its label is denoted as $f_r$. If $f_r = \phi$, which means that r is fully occluded, the region may be considered in its entirety. If the region r is not fully occluded, all the points in r are warped into a second image (see to the right in FIG. 3). The warped segment r' may cross a number of segments (i.e. r' may reside in all or part of two or more segments) in the second image. For example, the patch r' occupies part of the two segments s' and t' in the right image in FIG. 3. Assuming that the shared edge between s' and t' is e', there should be a shared edge e in r corresponding to e'. As a result, the points in r are separated into two sets, $q_1$ and $q_2$, by e. Herein, these sets will be referred to as the patches of the region r. In one implementation, the following relationships are defined: $q_r^{f_r}(i)$ is the i-th patch of segment under label $f_r$.

By assuming that the boundary of segment in the right image is potentially discontinuous, the corresponding shared edge in the left image is potentially an occlusion boundary. Accordingly, the same visibility may be enforced for all the points within a patch, and may be referred to as the patch-consistency constraints. Different patches can have different visibilities, but one patch cannot be partly occluded. In this way, the implementation uses segmentation information in one image to disclose a hard constraint to occlusion in the other image. In contrast, the partial visibility within a segment (i.e., the visibility of some pixels and not others within the segment) is allowed and the occlusion boundary is guided by segmentation information.

The definition of patch is symmetric, i.e. the patches in the right image can be similarly defined. For example in FIG. 3, $q'_1$ and $q'_2$ in the right image are patches of segment s' and t' respectively if they are assigned using the same label $f_r$. In this situation, the term $q_1 \sim q'_1$ (and $q_2 \sim q'_2$) may be called a patch pair, because if one of them is visible, the other should be visible too. If there is $f_{t'} \neq f_r$, then for each visible patch in t', a corresponding patch within one segment of the left image with the label $f_{t'}$ can be found. Accordingly, all visible patches in the left and right images are paired.

Using the patch-consistency constraint, the label configuration can be reformulated in a segment-patch level. That is, for each segment r in either image, the segment may be assigned a label $f_r \in L$, and if $f_r \neq \phi$, an equal number of visibilities $v_r(i)$ may also be assigned, denoted for example as $v_r(q_r(i))$ for each patch of r. The i-th patch of r is visible if $v_r(i)=1$ and is otherwise occluded. Additionally, the configuration is constrained to be regular, i.e., the visible patches in the configuration are paired. For example in FIG. 3, if $f_r \neq \phi$ and $v_r(q_1)=1$, a constraint is applied such that $f_{s'}=f_r$ and $v_{s'}(q'_1)=1$.

Accordingly, the following notation allows the label of each point to be computed as:

$$f_p = \begin{cases} f_r & f_r \neq \phi \wedge v_r(i) = 1 \\ \phi & \text{otherwise} \end{cases}, \forall p \in q_r(i).$$

For convenience, the informal notation f will be used to denote the configuration in a segment-patch level in the rest of the disclosure.

A third aspect of occlusion handling involves an energy function. In one implementation, the optimal configuration under an energy minimization framework may be computed as follows:

$$f_{opt} = \arg\min_f E(f)$$
$$= \arg\min_f \{E_{data}(f) + E_{smooth}(f) + E_{occl}(f)\}$$

The term $E_{data}(f)$ is the energy of matching errors for each visible patch, and is defined as:

$$E_{data}(f) = \sum_r T(f_r \neq \phi) \sum_i \varepsilon_{patch}(q_i, f_r),$$

$$\varepsilon_{patch}(q_i, f_r) = \sum_{p \in q_i, p \xrightarrow{f_r} p'} \varepsilon_{point}(p, p')$$

where T(•) equals 1 if the argument holds and otherwise 0, and $\varepsilon_{point}(p,p')$ is the intensity difference between point p in the one image and point p' in the other image.

The term $E_{smooth}(f)$ exploits smoothness assumptions. If two connected patches with the same label contain different visibility, a penalty may be imposed. The selection of this smoothness term affects whether the energy can be minimized efficiently by graph-cuts.

The term $E_{occl}(f)$ provides penalties to occluded pixels. This prevents a trivial configuration wherein all pixels are occluded from taking the least energy. The term is defined as:

$$E_{occl}(f) = C_o \sum_r E_{occl}(r),$$

$$E_{occl}(r) = \begin{cases} S_a(r) & f_r = \phi \\ \sum_i (1 - v_r(i)) & \text{otherwise} \end{cases}$$

where $C_o$ is an occlusion constant controlling the weight of occlusion energy in the summation and $S_a(r)$ is the area (the number of points) in r.

Energy Minimization

Patches are generated by warping the segment according to its label, but the label of a segment is unknown before matching. Accordingly, a global framework is disclosed, which allows computation of labels of segments and the visibility of each patch simultaneously.

An aspect of energy minimization involves an α-expansion framework. A segment can have |L| possible labels, and the separation of the segment into patches is generally different under each label. Accordingly, the searching space is huge; therefore, it is impractical to search the optimal result directly. In one implementation, it is convenient to use the α-expansion framework proposed by Boykov et al to solve the problem. In such an implementation, the problem is solved in an iterative style, and a strong local minimum is obtained in each iteration. Upon convergence, the global minimum is obtained.

In such an implementation, a configuration with all segments occluded is the starting point. Within each iteration, a label α is chosen, and a local minimum within one α-expansion is computed using graph-cuts. If no label can further decrease the energy, the final minimized configuration has been obtained. If a configuration is within an α-expansion of f, a segment can only have one of the following three choices: the first is that the segment maintains its current label in f; the second is that the segment may become occluded; the third is that the segment may change its label to α, and the configuration should keep to be regular.

In a further example, the energy minimization may be performed using a binary-variable energy term. In particular, a calculation converts the minimization of E(f) in each iteration (α-expansion calculation) into a minimization of a binary-variable energy, so that the latter minimization can be performed by graph-cuts.

In some implementations, the segments are classified into two classes according to their labels before expansion. In a first classification, for each segment r in either image, $f_r \notin \{\phi, \alpha\}$, a labeling variable $l_r$ is allocated to decide the label of r after expansion, which may be denoted as $\hat{f}_r$. The relation between $l_r$ and $\hat{f}_r$ may be defined as:

$$\tilde{f}_r = \begin{cases} f_r/\phi & l_r = 0 \\ \alpha/\phi & l_r = 1 \end{cases}.$$

Whether $f_r$ equals $\phi$ is determined by the visibility of the patches. Suppose that the number of segments r within patches labeled $f_r$ and $\alpha$ are $N_r^0$ and $N_r^\alpha$ respectively. The visibility of the patches may be determined according to the following two cases. In a first case, if r is in the left image, the term $N_r^0$ may be used to allocate visibility variables, $b_r^0(i)$, indicating visibilities of patches under the label $f_r$ when $l_r=0$, and $\tilde{v}_r(i)=1-b_r^0(i)$. An allocation can be made according to: $N_r^\alpha$ visibility variables, $b_r^\alpha(i)$, indicating visibilities of patches under the label $\alpha$ when $l_r=1$, and define $\tilde{v}_r(i)=b_r^\alpha(i)$. In a second case, if r is in the right image, new binary variables do not have to be allocated, and the correct binary variables do not have to be allocated for segments in the left image to indicate the visibility of the patches. The same notation may be used for those chosen visibility variables.

In a second classification, for each segment $r \subset P$, $f_r \in \{\phi, \alpha\}$, labeling variable is not necessary, only visibility variables $b_r^\alpha(i)$ are allocated. The set of all binary variables is denoted as $V=\{l_r, b_r^0(i), b_r^\alpha(i)\}$.

Some implementations apply other constraints for values of V. If $l_r \neq 0$, it may be required that $\forall b_r^0(i) \neq 0$, and if $l_r \neq 1$, $\forall b_r^\alpha(i) \neq 1$. If this requirement is satisfied, then V is regular; otherwise, V is irregular. When V is regular, the corresponding configuration may be denoted as f(V).

The $\alpha$-expansion calculation can be performed by minimizing the following energy function of binary variables:

$$\tilde{f} = \arg\min_V E^b(V),$$

$$E^b(V) = \begin{cases} E(f(V)) & V \text{ is regular} \\ \infty & \text{otherwise} \end{cases}$$

The term $E^b(V)$ can be rewritten as the sum of the following terms:

$$E^b(V) = E_{reg}^b(V) + E_{data}^b(V) + E_{smooth}^b(V) + E_{occl}^b(V)$$

The term $E_{reg}(V)$ takes an infinite value if V is not regular, and 0 otherwise. The term $E_{reg}(V)$ can be written from the definition of regular V:

$$E_{reg}(V) = \sum_r \sum_i E_{reg}^0(l_r, b_r^0(i)) + \sum_i E_{reg}^\alpha(l_r, b_r^\alpha(i)),$$

$$E_{reg}^0(l_r, b_r^0(i)) = \begin{cases} \infty & l_r = 1 \wedge b_r^0(i) = 0 \\ 0 & \text{otherwise} \end{cases},$$

$$E_{reg}^\alpha(l_r, b_r^\alpha(i)) = \begin{cases} \infty & l_r = 0 \wedge b_r^\alpha(i) = 1 \\ 0 & \text{otherwise} \end{cases}$$

The terms $E_{data}^b$ and $E_{occl}^b$ can be trivially derived from the definition of $E_{data}$ and $E_{occl}$. The visibility variables are assignment-like variables. The similar smoothness energy function is:

$$E_{smooth}^b(V) = C_s \sum_q \sum_{q_n \in N_q} S_c(q, q_n) \cdot T(b_q = b_{q_n})$$

where $N_q$ is the set of neighboring patches of q with the same label as q, $S_c(q,q_n)$ is the length of shared border of q and $q_n$, $b_q$ is the visibility variable corresponding to patch q, and $C_s$ is a smoothness constant controlling the balance of smoothness with other energy. The equivalent $E_{smooth}$ is $$E_{smooth} = \sum_q \sum_{q_n \in N_q^0} E_{smooth}(q, q_n)$$

$$E_{smooth}(q, q_n) = S_c(q, q_n) \begin{cases} 0 & f_q = f_{q_n} \\ C_s & f_q \neq \phi \vee f_{q_n} \neq \phi \\ 2C_s & \text{otherwise} \end{cases}$$

where $N_q^0$ is the set of neighboring patches of q.

A still further aspect of energy minimization involves the regularity of the energy function. The term $E^b(V)$ can be trivially rewritten as the sum of energy items up to 2 variables at a time, i.e:

$$E^b(V) = \sum_i E^i(v_i) + \sum_{i<j} E^{i,j}(v_i, v_j)$$

And for all $E^{i,j}(v_i, v_j)$, $$E^{i,j}(0, 0) = E^{i,j}(1, 1) = 0, \quad E^{i,j}(0, 1), \quad E^{i,j}(1, 0) \geq 0$$

Accordingly, the term obeys the regularity inequality introduced by Kolmogorov and Zabih. Moreover, the results of Kolmogorov and Zabih can be used to compute the minimization of $E^b(V)$.

Example Implementations

Figure 4:
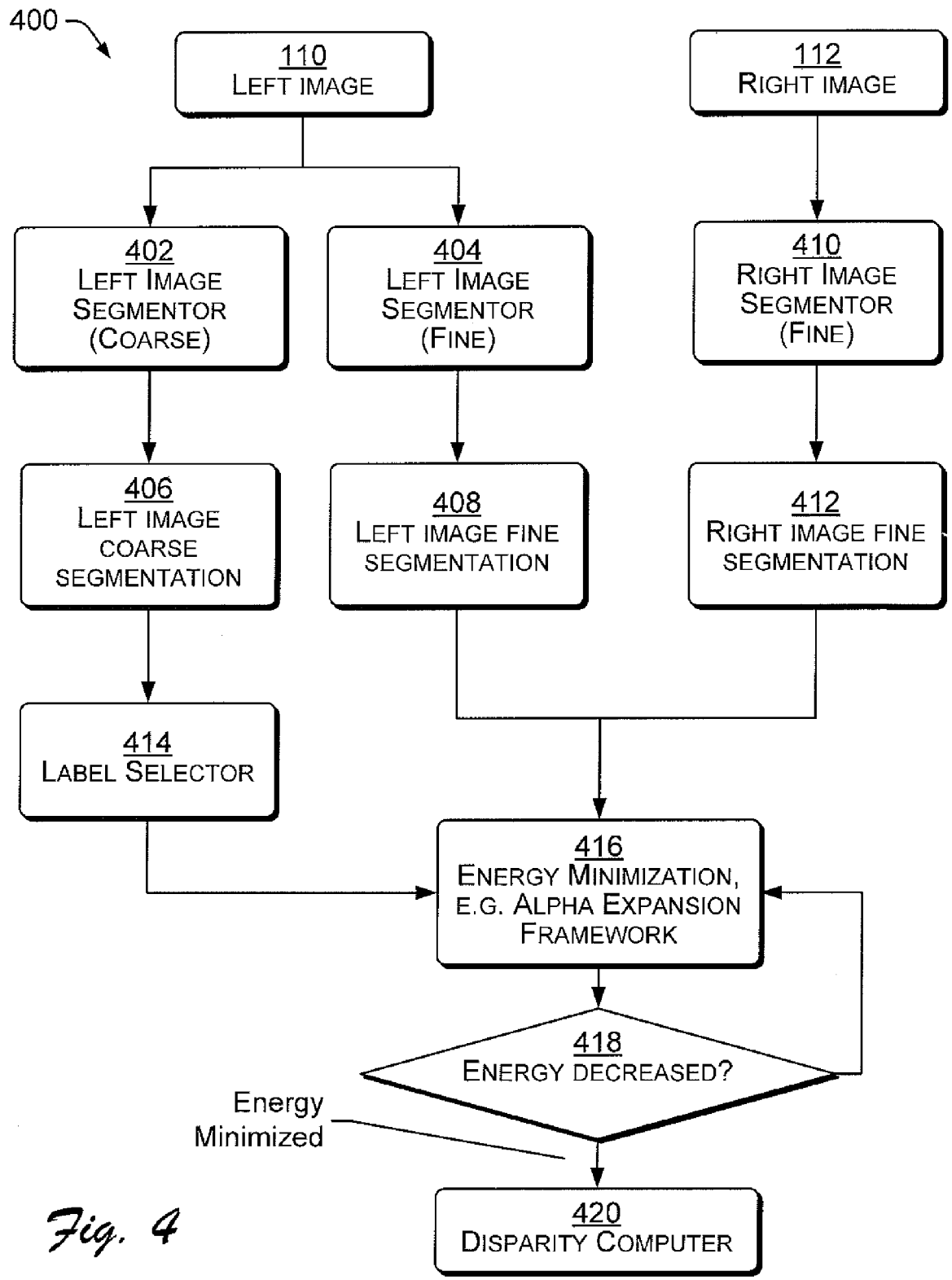
FIG. 4 shows a block diagram illustrating a first example implementation configured to handle occlusions in stereo imaging.
Figure 6A:
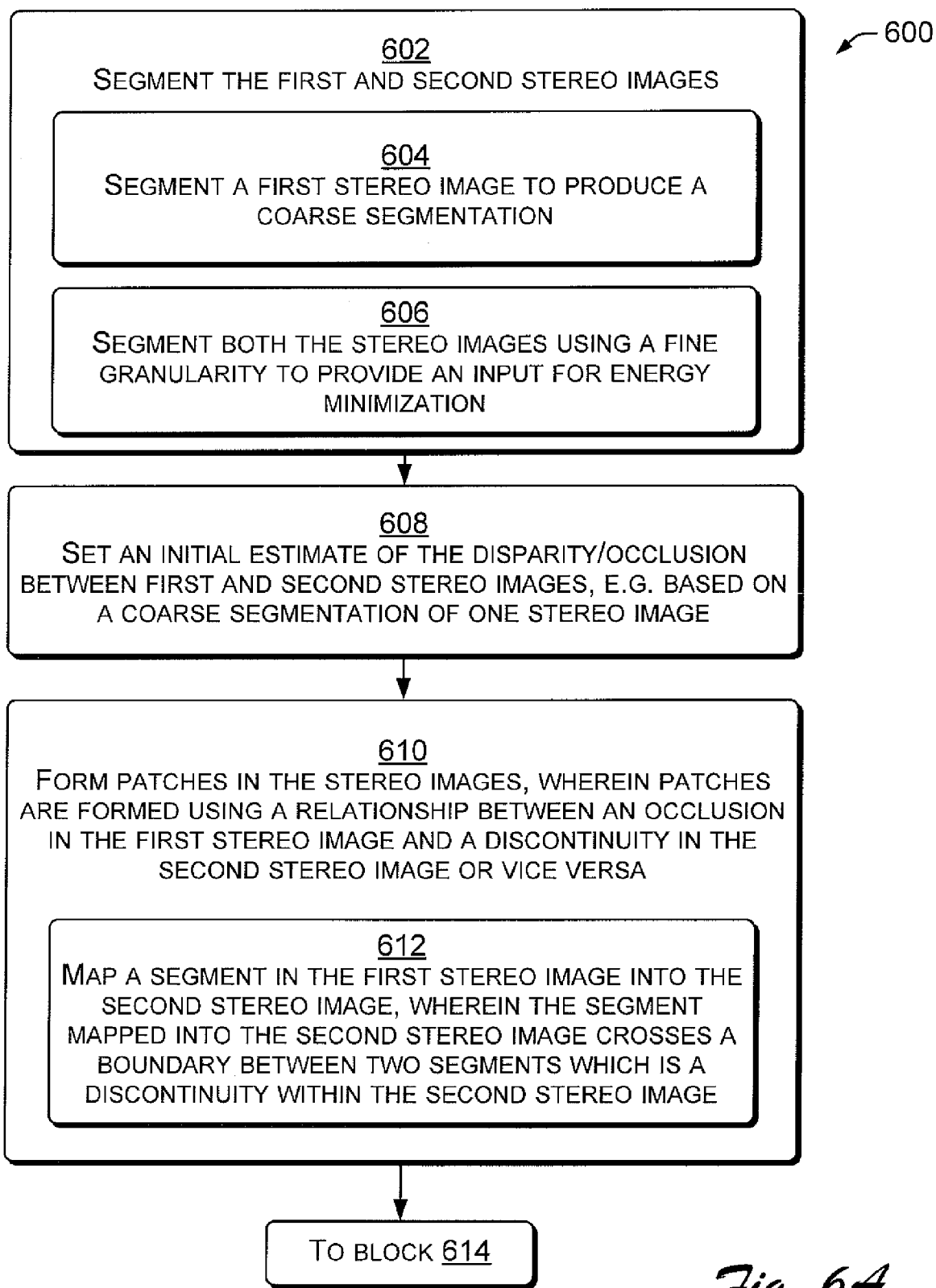
FIG. 6 shows a block diagram illustrating a second example implementation configured for occlusion handling in stereo image handling.
Figure 6B:
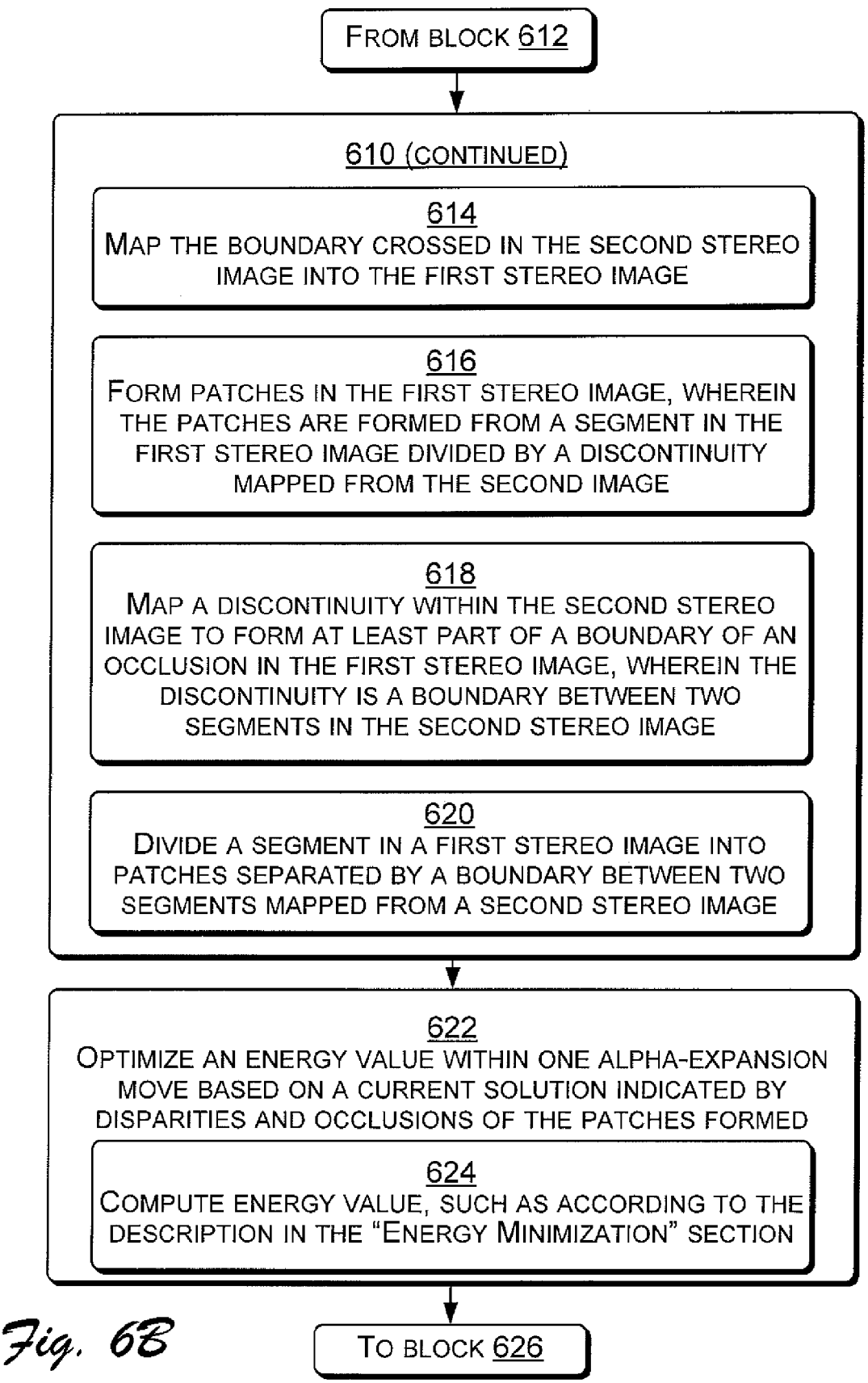
Figure 6C:
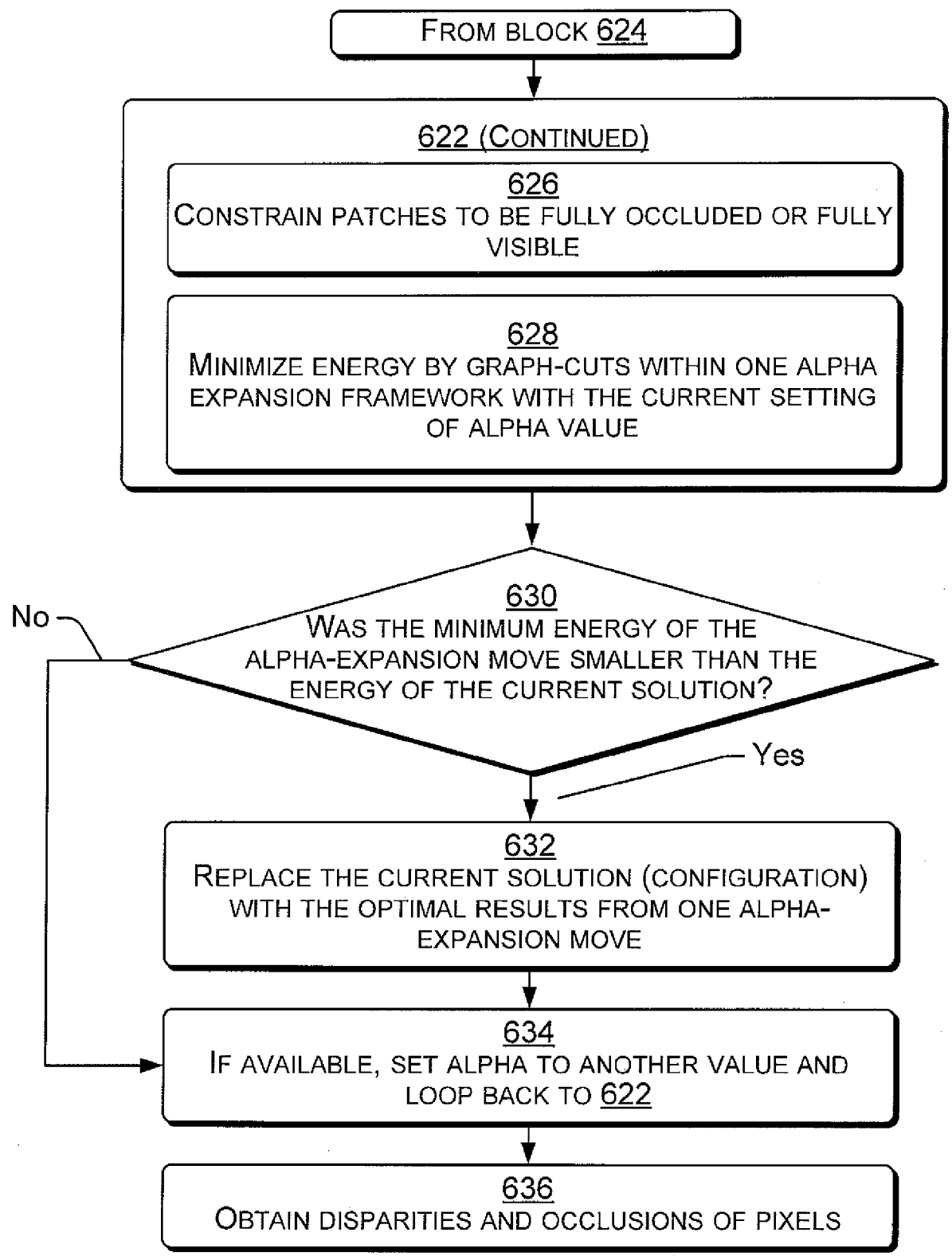

FIGS. 4 and 6 show two implementations illustrating aspects of occlusion handling in stereo imaging. While these two implementations are shown, other alternatives are possible using the principles disclosed herein. Turning first to FIG. 4, a block diagram 400 depicts one example of a system and an algorithm consistent with the teachings expressed herein. The algorithm may be implemented by any practical means, such as by operation of a computer 700 seen at FIG. 7. Accordingly, the functionality disclosed by diagram 400, including the various calculators, selectors, etc., may be implemented by instructions configured for operation of a computing device.

Figure 5A:
FIG. 5 illustrates example images having segmentation of both coarse and fine granularity.

Left image segmentors 402, 404 can be configured as a computer subroutines or procedures, and are configured to segment the left image 110. In particular, two levels of segmentation are produced—e.g. a coarse segmentation 406 and a fine segmentation 408 are produced. The coarse segmentation 406 of the left image 110 includes relatively large segments, and is sent to the label selector 414. The coarse segmentation 406 can be made in a number of different ways, such as by using a mean-shift segmentation algorithm. An example of the relatively large segments resulting from the coarse segmentation is seen in FIG. 5A.

The label selector 414 is configured to receive the coarse (large) segmentation 406 of the left image 110, and to employ a labeling algorithm to get a coarse estimation of the solution space. The course estimation will reduce the search range subsequently encountered by the energy minimization framework. The labeling problem can be formulated as a discrete optimization problem, which finds the optimal solution in a discrete space. Accordingly, the disparity selection routine of the label selector 414 increases efficiency by confining the solution to a smaller space.

The correspondence problem in stereo imaging can be formulated as a discrete optimization problem, which finds the optimal solution in a discrete space using the energy minimization routine 416. The label selector 414 is implemented to help this optimization or energy minimization routine 416 to search within a smaller solution space at greater speed. In one example of the label selector 414, a Sum-of-Absolute-Difference (SAD) algorithm, such as Birthfield and Tomas's dissimilarity algorithm, together with a cross-checking algorithm, may be used to find disparities of reliable points. A plane fitting is configured to select the label set L. Thus, the label selector reduces the search range addressed by the α-expansion framework in the subsequent energy minimization routine 416.

Figure 5B:
Figure 5C:

A fine image segmentor 404 is configured to create a finer (i.e. more detailed) segmentation 408 of the left image 110, such as that seen in FIG. 5B. Similarly, a right image segmentation routine 410 is configured to create a similarly detailed segmentation 412 of the right image 112. An example of such a segmentation is shown in FIG. 5C. The detailed segmentations from the left and right images 408, 412 are input to the energy minimization routine 416.

The energy minimization routine 416 may be configured to use an iterative process to compute the optimal solution for computing disparity and occlusion for patches. In one implementation, the energy minimization routine 416 is configured according to the description in the section "Energy Minimization," above. For example, the energy minimization calculations may be performed by an α-expansion framework described above. Each iteration of the framework can be considered an alpha-move of the configuration, wherein the configuration is the labeling result or the solution of the optimization problem. Each iteration additionally computes the minimal energy value of the current iteration. At block 418 it is determined whether this minimum is smaller than that of the current solution, the iteration continues; otherwise, iteration is stopped. Within each alpha-move the problem is reformulated into a binary-variable energy minimization framework, which can be optimized by graph cuts under the condition of regularity, which is a classical optimization algorithm. Accordingly, the energy minimization routine 416 calculates the disparity and occlusion of each patch.

At block 420, the disparity and occlusion of each pixel are computed simultaneously according to the labeling result from the energy minimization routine 416. The result of the block 416 is a value for the disparity of each patch. Accordingly, at block 420 the disparity for each pixel is computed.

An aspect of the implementation of the algorithm involves parameter selection. In particular, selection of two parameters may be considered, including the smoothness constant $C_s$ and occlusion constant $C_o$. In some applications, $C_s$ is sensitive to input images. Accordingly, a modification to the method may be used to select the value automatically, thereby making the algorithm more adaptive.

One example strategy for making the selection is implemented according to the following analysis. The data error energy is used to select the correctly matched patch pair, which contains the least SAD error in noise free situation. Noise may cause an incorrect patch to have smaller errors than the correct patch. However, the incorrect patch is often inconsistent with the neighbors. Smoothness energy is used to punish the inconsistency and reject the wrong match. Therefore, in some implementations, a larger constant is selected for a greater noise level.

The noise level is estimated using the disparity map of reliable points in the label selection step. For each reliable point, a matching error $\epsilon$ may be computed, and the average of all matching errors $\bar{\epsilon}$ taken as the average noise level. The term $C_s$ is set by a value proportional to $\bar{\epsilon}$.

FIG. 6 shows a second implementation 600 illustrating aspects of occlusion handling in stereo imaging. The implementation may be performed by any appropriate means including, for example, hardware logic blocks on an ASIC or by the execution of processor-readable instructions defined on a processor-readable medium, such as media 706, 716, 720, 724 seen in FIG. 7. As used herein, a computer and/or processor-readable medium can be any means that can contain or store instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, a portable computer diskette, a random access memory (RAM), a read-only memory (ROM), an erasable programmable-read-only memory (EPROM or Flash memory), a rewritable compact disc (CD-RW), and a portable compact disc read-only memory (CDROM).

At block 602, first and second stereo images are segmented. In one example implementation, a coarse segmentation is applied to one stereo image, e.g. the left image. An example of this result is seen in FIG. 5A. Additionally, a fine segmentation is applied to both stereo images. FIGS. 5B and 5C show examples of left and right stereo images having a fine segmentation applied. Blocks 604-606 illustrate one example implementation of the segmentation process. At block 604 the first stereo image is segmented to produce a coarse segmentation. Referring briefly to briefly to the example of FIG. 4, a coarse segmentation 406 of the left image 110 is produced by the segmentor 402. The coarse segmentation 406 is input to the label selector 414, wherein an initial estimation of the disparity and occlusions of the stereo image pair is made. At block 606, the stereo images are both segmented using a fine granularity to provide an input for energy minimization calculations. Referring to the example of FIG. 4, left and right fine segmentations 408, 412 are produced from the left and right images 110, 112. In the example of FIG. 4, the fine segmentations are used in the alpha expansion framework. In the example of FIG. 3, the fine segmentations are used in the formation of patches. In that example, the segments r, s' and t' are fine segmentations of the left and right stereo images, and $q_1$ and $q_2$ are patches of the left stereo image.

At block 608, an initial estimate of the disparity and/or occlusion between first and second stereo images is made. In the example of FIG. 6, the initial estimate is made using the coarse segmentation of one of the stereo images. Based on coarse segmentation result, a Sum-of-Absolute-Difference (SAD) algorithm with Birthfield and Tomas's dissimilarity algorithm plus cross-checking algorithm is used to find disparities of reliable points. A plane fitting method is exploited to select the label set. This label set selection constrains the disparities to a smaller solution space, thereby simplifying and speeding an energy minimization process.

At block 610, patches are formed in the stereo images, wherein patches are formed using a relationship between an occlusion in the first stereo image and a discontinuity in the second stereo image. The formation of patches can be performed symmetrically, i.e. patches may be formed in a second stereo image in the same manner that patches are formed in the first stereo image. Several example implementations of the formation of patches are disclosed at blocks 612-620. These examples are considered representative of the concepts involved. Accordingly, other implementations consistent with the teachings herein are possible.

The example of forming patches seen at blocks 612-616 can be understood with reference to FIG. 3 and the description of that figure. At block 612, a segment in the first stereo image is mapped into the second stereo image. As a result of the mapping, the segment mapped into the second stereo image may cross a boundary between two segments within the second stereo image. At block 614, the boundary crossed in the second stereo image is mapped into the first stereo image. At block 616, patches are formed in the first stereo image according to the mapped boundary. In particular, patches are formed by division of the segment in the first stereo image by the mapped boundary, a discontinuity mapped from the second stereo image. The mapped boundary forms part of a border of an occlusion in the first stereo image.

A further example wherein patches are formed is seen at block 618. In this example, a discontinuity within a second stereo image is mapped into a first stereo image. The mapping forms a portion of a boundary of an occlusion in the first stereo image. Accordingly, the example illustrates a relationship between a discontinuity in the second stereo image and the border of an occlusion in a first stereo image.

A still further example wherein patches are formed is seen at block 620. In this example, a segment in a first stereo image is divided into patches separated by a portion of a boundary between two segments mapped from a second stereo image. Referring to the example of FIG. 3, a portion of the boundary e' separating the separating the segments s' and t' in the second stereo image is mapped to the first stereo image. As a result, the boundary e divides the segment r into patches $q_1$ and $q_2$.

At block 622 an energy value is optimized within one alpha-expansion move, such as by using graph cuts. The optimization is performed based on a current solution, wherein the current solution is indicated by disparities and occlusions of the patches formed. Thus, the optimal configuration within one alpha-expansion move is obtained. Blocks 624-628 show example implementations wherein the energy value is optimized within one alpha-expansion move. In the example of block 624, energy is computed according to the description in the section "Energy Minimization," above. In the example of block 626, the calculation is made in a manner that constrains the patches to be fully occluded or fully visible. In the example of block 628, energy is minimized by graph-cuts within one alpha-expansion move at the current setting of alpha-value. The optimal solution from calculations based on graph cuts may include disparities and occlusions defined at a patch level.

At block 630, a determination is made if the minimum energy of the alpha expansion move is smaller than the energy of the current solution. That is, a determination is made to see if any alpha value from a discrete set of values has smaller energy than the current solution. If the minimum energy is smaller than the energy of the current solution, then at block 632 the current solution (i.e. the configuration or labeling result or the solution to the optimizing problem) is replaced with the optimal results from the alpha-expansion move.

Alternatively, at block 634, a determination is made if all of the possible values for alpha have been tried. Recall that a discrete number of values of alpha may be used. If another value for alpha is available, the algorithm loops back to block 622. If not, the algorithm proceeds to block 636.

At block 636, the disparities and occlusions of the pixels are output. In one implementation, the disparities and the occlusions at the patch level are used to obtain disparities and occlusions of individual pixels. Knowing the disparities and occlusions of individual pixels allows the stereo images to be better utilized. For example, this information allows the images to be combined more effectively.

Figure 7:
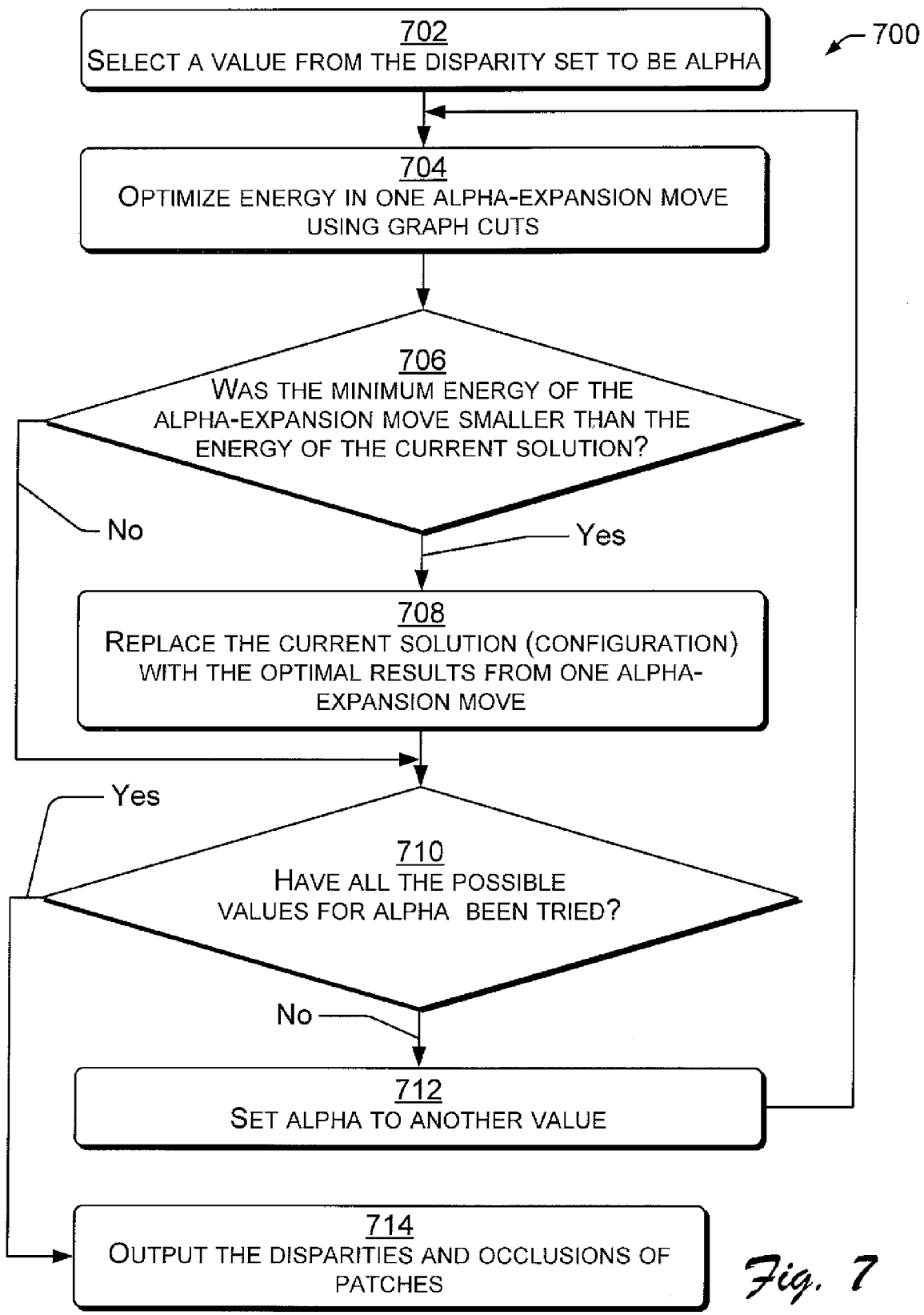
FIG. 7 shows a block diagram illustrating an example implementation of the energy minimization using alpha-expansion framework.

FIG. 7 shows an example implementation 700 illustrating the energy minimization using alpha-expansion framework. At block 702, a value is selected from a disparity set to be used as alpha.

At block 704, energy is optimized in one alpha-expansion move. In the example of FIG. 7, the optimization may be made using graph cuts. The alpha expansion move may be configured so that alpha is set for all of the pixels. Each pixel should be categorized according to: 1) no change is made to the pixel's disparity; 2) change the pixel's disparity to alpha; or 3) change the pixel to an occluded state. Accordingly, if two variables are used (for example, a disparity variable and a visibility variable) to model each pixel, the formulation can be configured as a binary-variable problem (the variable is binary, 0 or 1). Such a formulation (i.e. the current solution) can be optimized by graph cuts to get the optimal solution for the current setting of alpha.

At block 706, a comparison between the minimum energy of the alpha-expansion move and the energy of the current solution. If the energy of the alpha-expansion move is smaller than the energy of the current solution, then at block 708 the current solution (i.e. configuration) is replaced with the optimal results from one alpha-expansion move. Accordingly, it can be seen that the formation of patches and the energy minimization are not divided into clearly separate stages. In the energy minimization, one labeling result is selected initially. Given this labeling result, the segment can be warped from one image to the other image, facilitating formation of patches. A computation may then be made of the energy. Results of the energy computation can be used to validate a patch. That is, an energy term having a lower value will result if the constraints indicate a valid patch. If the energy is large, the current solution may be updated, thereby becoming a new solution. Energy calculations based on successive new solutions will executed until the energy achieves the global minimum. In the process of making energy calculations, the occlusion result is also derived, since the energy term is defined based on a visibility variable. Accordingly, the occlusion and disparity can be considered to have been derived simultaneously. In fact, obtaining the optimal solution results in the occlusion result, the disparity and a valid construction of the patches.

At block 710, a check is made to determine if all of the values for alpha have been tried. Recall that within the solution set or solution space alpha may comprise a set of discrete values. For example, a set containing possible labeling values may be {0, 1, 2, 3, 4}. Accordingly, the check at block 710 determines if all values within the discrete set have been tried. If not, at block 712 alpha is set to another value and energy calculations are again made at block 704. If so, the disparities and occlusions are output at the patch level at block 714.

Computing Environment

Figure 8:
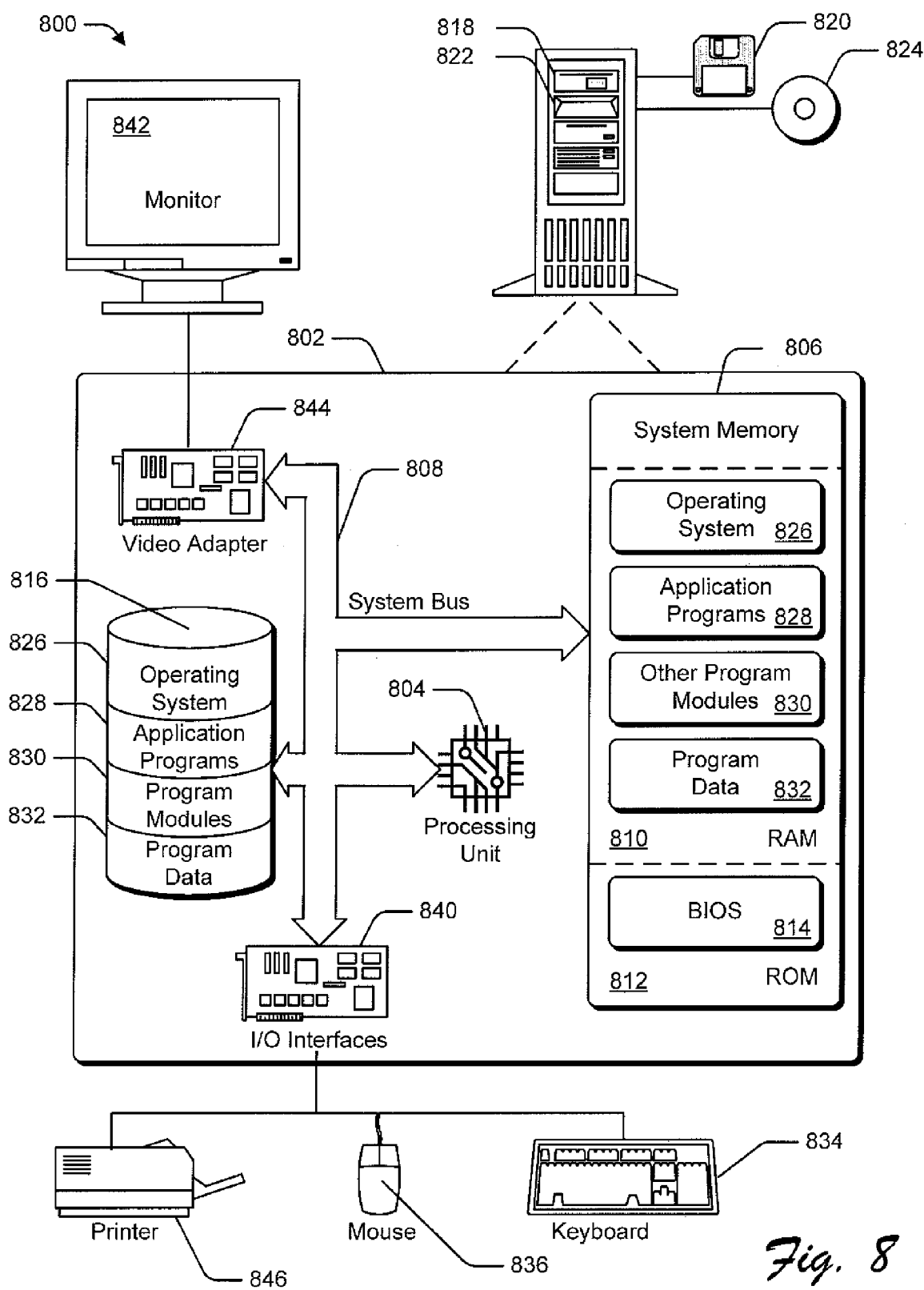
FIG. 8 illustrates an example implementation of a computing environment suitable for handling occlusions during stereo image processing.

FIG. 8 illustrates an exemplary computing environment suitable for implementing a computer 800 suitable for implementation of occlusion handling in stereo imaging. The computing environment 800 includes a general-purpose computing system in the form of a computer 802. The components of computer 802 can include, but are not limited to, one or more processors or processing units 804, a system memory 806, and a system bus 808 that couples various system components including the processor 804 to the system memory 806. The system bus 808 represents one or more of any of several types of bus structures, including a memory bus or memory controller, a peripheral bus, a Peripheral Component Interconnect (PCI) bus, an accelerated graphics port, and a processor or local bus using any of a variety of bus architectures.

Computer 802 typically includes a variety of computer readable media. Such media can be any available media that is accessible by computer 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 can also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces. Alternatively, the hard disk drive 816, magnetic disk drive 818, and optical disk drive 822 can be connected to the system bus 808 by a SCSI interface.

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media that can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may include an embodiment of a caching scheme for user network access information. In one implementation, instructions for use in handling occlusions in stereo imaging could be stored as an application program in disk area 828.

Computer 802 can include a variety of computer/processor readable media identified as communication media. Communication media typically embodies computer readable instructions, data structures, program modules, or other data.

A user can enter commands and information into computer system 802 via input devices such as a keyboard 834 and a pointing device 836 (e.g., a "mouse"). These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 844, other output peripheral devices can include components such as speakers (not shown) and a printer 846 that can be connected to computer 802 via the input/output interfaces 840.

CONCLUSION

Although aspects of this disclosure include language specifically describing structural and/or methodological features of preferred embodiments, it is to be understood that the appended claims are not limited to the specific features or acts described. Rather, the specific features and acts are disclosed only as exemplary implementations, and are representative of more general concepts. For example, while reference has been made to "left" or "right" images, it is clear that reversing the images used in different steps and/or situations is clearly anticipated.

The invention claimed is:

1. One or more computer-readable random access memory devices comprising computer-executable instructions for occlusion handling in stereo imaging, the computer-executable instructions comprising instructions for:
   segmenting a first stereo image to result in a coarse segmentation, the first stereo image being either a left or right image;
   labeling the coarse segmentation of the first stereo image;
   setting an initial estimate of a disparity and occlusions between the first stereo image and a second stereo image, the initial estimate based on the labeling of the coarse segmentation, the second stereo image being the other of the left or the right image;
   segmenting the first and second stereo images to result in fine segmentations, the fine segmentations being more granular than the coarse segmentation;
   optimizing energy within an alpha-expansion move, the alpha expansion move initially based on the fine segmentations and the initial estimate, and thereafter based on a current solution indicated by disparities and occlusions of the fine segmentations;
   pairing two fine segmentations, the pairing performed by:
      finding a first fine segmentation within the first stereo image and a second fine segmentation within the second stereo image, wherein a sum of absolute difference (SAD) error between the first and second fine segmentations is minimized;
      calculating a measure of smoothness energy between the second fine segmentation and at least one neighbor of the second fine segmentation on the second stereo image, wherein the measure of smoothness energy is based on a difference between labels of two neighboring segments; and
      evaluating the SAD error and the measure of smoothness energy to determine if the first fine segmentation within the first stereo image should be paired with the second fine segmentation within the second stereo image; and
   obtaining disparities and occlusions of pixels in the matched pair of segmentations within the stereo images based on the energy optimization.

2. The one or more computer-readable random access memory devices of claim 1, wherein setting an initial estimate comprises instructions for:

defining a discrete space within which an optimal solution will be defined, wherein the defining is based on a coarse segmentation of one of the stereo images.

3. The one or more computer-readable random access memory devices of claim 1, wherein segmenting the first and second stereo images comprises instructions for:
mapping a discontinuity within the second stereo image to form at least part of a boundary of an occlusion in the first stereo image, wherein the discontinuity is a boundary between two segments in the second stereo image.

4. The one or more computer-readable random access memory devices of claim 1, wherein segmenting the first and second stereo images comprises instructions for:
mapping a segment in the first stereo image into the second stereo image, wherein the segment mapped into the second stereo image crosses a boundary between two segments within the second stereo image;
mapping the boundary crossed in the second stereo image into the first stereo image; and
dividing the segment in the first stereo image into two segments separated by the mapped boundary.

5. The one or more computer-readable random access memory devices of claim 1, wherein optimizing energy comprises instructions for:
minimize energy using graph-cuts within one alpha expansion framework with a current setting of alpha.

6. The one or more computer-readable random access memory devices of claim 1, wherein optimizing energy comprises instructions for:
constraining the segments formed to be fully occluded or fully visible.

7. A computing system, comprising:
one or more processors;
a memory device, configured for access by the one or more processors; and
processor executable instructions, defined on the memory device and executable by the one or more processors, for:
segmenting a first stereo image to result in a coarse segmentation;
using the coarse segmentation to define a space within which an optimal solution exists;
segmenting the first stereo image and a second stereo image to result in fine segmentations;
mapping discontinuities within one of the fine segmentations to discover disparities and occlusions in the other fine segmentation;
optimizing energy of a current solution within the defined space, wherein the current solution comprises the discovered disparities and occlusions;
pairing two fine segmentations, the pairing performed by:
finding a first fine segmentation within the first stereo image and a second fine segmentation within the second stereo image, wherein a sum of absolute difference (SAD) error between the first and second fine segmentations is minimized;
calculating a measure of smoothness energy between the second fine segmentation and at least one neighbor of the second fine segmentation on the second stereo image, wherein the measure of smoothness energy is based on a difference between labels of two neighboring segments; and
evaluating the SAD error and the measure of smoothness energy to determine if the first fine segmentation within the first stereo image should be paired with the second fine segmentation within the second stereo image; and
obtaining disparities and occlusions of pixels in the pair of segmentations within the stereo images from the energy optimization.

8. The computing system of claim 7, wherein mapping discontinuities comprises instructions for:
forming patches in both of the stereo images, wherein the patches are formed using a relationship between an occlusion in the first stereo image and a discontinuity in the second stereo image.

9. The computing system of claim 8, wherein forming patches comprises instructions for:
mapping a boundary separating two segments on the second stereo image to the first stereo image, wherein the mapped boundary defines at least part of a boundary of an occlusion in the first stereo image and at least part of a boundary of a discontinuity in the second stereo image, and wherein two patches are formed within the first stereo image by the mapping.

10. The computing system of claim 7, wherein mapping discontinuities comprises instructions for:
mapping a segment in the first stereo image into the second stereo image, wherein the segment mapped into the second stereo image crosses a boundary between two segments within the second stereo image;
mapping the boundary crossed in the second stereo image into the first stereo image; and
dividing the segment in the first stereo image into two patches separated by the mapped boundary, wherein each of the two patches is constrained to be fully occluded or fully visible.

11. The computing system of claim 7, wherein optimizing energy of the current solution comprises instructions for:
minimizing energy in an iterative $\alpha$-expansion framework, wherein each iteration implements an $\alpha$-move of a configuration comprising a labeling result or a solution to an optimization problem, and computes a minimum of the currently implemented $\alpha$-expansion framework.

12. The computing system of claim 7 additionally comprising instructions for:
iteratively changing the current solution and optimizing energy until a minimal energy has been found; and
performing an alpha expansion move wherein disparities and occlusions of some fine segmentations are assigned a value $\alpha$ in an $\alpha$-expansion framework.

13. The computing system of claim 12 additionally comprising instructions for:
performing a sequence of $\alpha$-expansion moves until a minimal energy for all available $\alpha$ values has been found; and
obtaining a disparity value, occlusions and patch information for the images upon the minimal energy.

14. The computing system of claim 13, wherein the obtained disparity value and occlusions are based on patches.

15. A computer implemented method for occlusion handling in stereo imaging, comprising:
segmenting a first stereo image to result in a coarse segmentation, the first stereo image being either a left or right image;
labeling the coarse segmentation of the first stereo image;
setting an initial estimate of a disparity and occlusions between the first stereo image and a second stereo image, the initial estimate based on the labeling of the coarse segmentation, the second stereo image being the other of the left or the right image;
segmenting the first and second stereo images to result in fine segmentations, the fine segmentations being more granular than the coarse segmentation;

mapping a portion of a border of a discontinuity in the second stereo image to indicate an occlusion in the first stereo image;

computing an energy level of a current solution comprising occlusions and disparities determined by the mapping, the computing of the energy level based on the initial estimate and the fine segmentations;

optimizing the energy level, initially based on the initial estimate, and thereafter using an α-expansion framework;

pairing two fine segmentations, the pairing performed by:
  finding a first fine segmentation within the first stereo image and a second fine segmentation within the second stereo image, wherein a sum of absolute difference (SAD) error between the first and second fine segmentations is minimized;
  calculating a measure of smoothness energy between the second fine segmentation and at least one neighbor of the second fine segmentation on the second stereo image, wherein the measure of smoothness energy is based on a difference between labels of two neighboring segments; and
  evaluating the SAD error and the measure of smoothness energy to determine if the first fine segmentation within the first stereo image should be paired with the second fine segmentation within the second stereo image; and obtaining disparities and occlusions of pixels in the paired fine segmentations based on the optimized energy level.

16. The method of claim 15, wherein the mapping comprises:

mapping a segment in the first stereo image into the second stereo image, wherein the segment mapped into the second stereo image crosses a boundary between two segments within the second stereo image;

mapping the boundary crossed in the second stereo image into the first stereo image; and dividing the segment in the first stereo image into two patches separated by the mapped boundary.

17. The method of claim 15, wherein optimizing the energy level comprises:

selecting a value from a disparity between the images to be alpha;

optimizing energy in one alpha-expansion move using graph cuts;

comparing optimized energy of different solutions;

replacing a solution depending on the comparison;

checking all alpha values; and outputting disparities and occlusions of patches.

18. The method of claim 15, wherein the α-expansion framework computes labels of segments and visibility of each pair of fine segmentations.

19. The method of claim 15, wherein in each iteration of the α-expansion framework, a local minimum is computed using graph-cuts.

20. The method of claim 15, wherein segmenting the first and the second stereo images results in fine segmentations, and wherein the discontinuity in the second stereo image is based on the segmenting.

* * * * *